Figure 1:
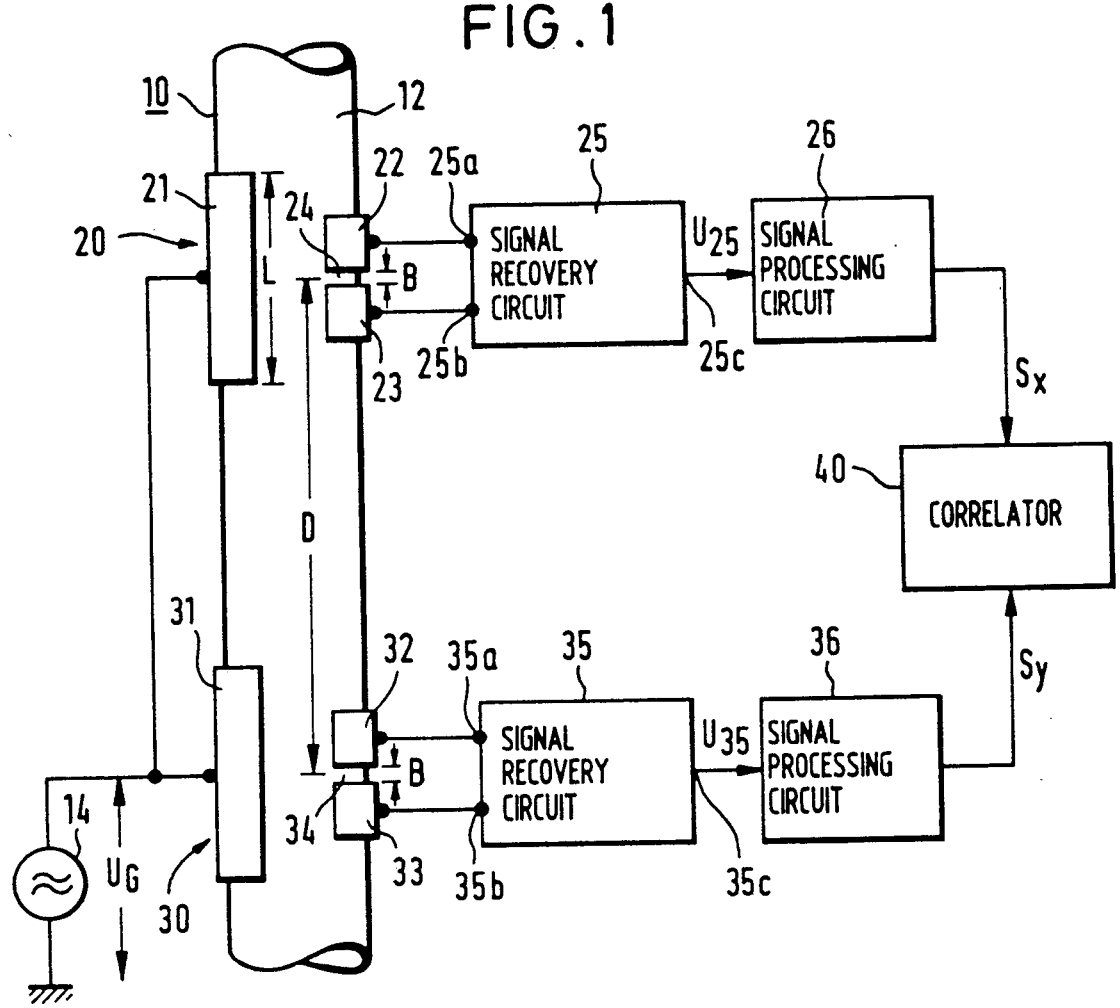

United States Patent [19]

Braun et al.

[11] Patent Number: 5,038,110
[45] Date of Patent: Aug. 6, 1991

[54] CIRCUIT ARRANGEMENT FOR SIGNAL RECOVERY IN A CAPACITIVE DIFFERENCE SENSOR

[75] Inventors: Hans Braun, Karlsruhe; Uwe Kessler, Oftersheim, both of Fed. Rep. of Germany

[73] Assignee: Endress u. Hauser GmbH u. Co., Fed. Rep. of Germany

[21] Appl. No.: 371,509

[22] Filed: Jun. 26, 1989

[30] Foreign Application Priority Data

Jun. 30, 1988 [DE] Fed. Rep. of Germany ....... 3822076

[51] Int. Cl.$^5$ ............................................. G01R 27/26
[52] U.S. Cl. ................................... 324/675; 324/682; 324/686
[58] Field of Search ............... 324/675, 674, 668, 682, 324/681, 667, 686, 689, 663, 633, 634, 658, 690

[56] References Cited

U.S. PATENT DOCUMENTS

| | | | |
|---|---|---|---|
| 3,009,101 | 11/1961 | Locher | 324/690 X |
| 3,039,051 | 6/1962 | Locher | 324/71.4 X |
| 3,959,723 | 5/1976 | Wagner | 324/668 |
| 4,002,996 | 1/1977 | Klebanoff et al. | 324/668 X |
| 4,752,727 | 6/1988 | Schneider | 324/71.4 X |
| 4,782,282 | 11/1988 | Bachman | 324/675 X |

FOREIGN PATENT DOCUMENTS 3433148  3/1986  Fed. Rep. of Germany .

Primary Examiner—Kenneth Wieder
Assistant Examiner—Robert W. Mueller
Attorney, Agent, or Firm—Barnes & Thornburg

[57] ABSTRACT

A capacitive difference sensor includes two sensor electrodes, each of which lies opposite a transmitting electrode fed by an electrical AC voltage source. A circuit arrangment connected to the two sensor electrodes for signal recovery generates a differential signal which corresponds to the difference between the displacement currents induced in the two sensor electrodes. The circuit arrangement includes a series resonance circuit comprising a coil and a capacitor, the resonance frequency of the series resonance circuit corresponding to the frequency of the AC voltage source. The two sensor electrodes are coupled via a transformer in opposite senses to the series resonance circuit and the differential signal is tapped off at the tap of the series resistance circuit formed by the connecting point between the coil and the capacitor.

7 Claims, 2 Drawing Sheets

CIRCUIT ARRANGEMENT FOR SIGNAL RECOVERY IN A CAPACITIVE DIFFERENCE SENSOR

The invention relates to a circuit arrangement for signal recovery in a capacitive difference sensor comprising two sensor electrodes, each of which lies opposite a transmitting electrode fed by an electrical AC voltage source, the circuit arrangement being so constructed that it generates a differential signal which corresponds to the difference of the displacement currents induced in the two sensor electrodes.

Capacitive difference sensors of this type, which are known for example from U.S. Pat. No. 4,752,727, are preferably used for signal recovery for contactless correlative travel time or velocity measurement and for similar purposes.

They have the advantage that even with relatively large dimensions they give good spatial resolving power with substantial direct signal suppression. For suppression of the influences of the ground capacitance in the circuit arrangement known from U.S. Pat. No. 4,752,727 each sensor electrode is connected to the inverting input of an associated operational amplifier of which the non-inverted input lies at the ground potential so that the two sensor electrodes are virtually maintained at the ground potential. The operational amplifiers separately amplify the output signals of the two sensor electrodes and the differential signal is obtained by forming the difference between the amplified output signals of the two operational amplifiers.

A substantial problem in this type of signal recovery resides in that the basic capacity of the capacitor formed by each sensor electrode with the transmitting electrode is itself very small and that the capacitance changes to be detected and representing the actual measuring effect are again several orders of magnitude smaller. Due to the geometrical dimensions the capacitance of such sensors lies in the range of less than 1 picofarad and the capacitance changes to be detected are of the order of magnitude of a few femtofarads. To enable capacitance changes of this order of magnitude to be detected by measuring technology a high resolution power of the amplifier electronics is necessary. The signal recovery proves to be very difficult in particular because capacitive sensors react very sensitively to external disturbing influences which are often many times greater than the actual measuring effect. If for example the flow velocity of pneumatically transported materials is to be correlatively measured with the aid of capacitive sensors the influence of frequently occurring electrostatically charged particles on the primary measuring signal can be several times greater than the effect caused by the change of the measuring capacitance. By the subsequent demodulation and filtering of the differential signal recovered from the amplified primary measuring signals such interfering influences frequently cannot be suppressed in spite of great circuitry expenditure.

An object of the invention is the provision of a circuit arrangement of the type mentioned at the beginning which with small circuitry expenditure permits good suppression both of the influence of the ground capacitances and of external interfering influences on the useful measuring signal.

According to the invention, the two sensor electrodes are coupled via a transformer in opposite senses to a series resonance circuit of which the resonance frequency corresponds to the frequency of the AC voltage source and the differential signal is taken off at the tap of the series resonance circuit.

In the circuit arrangement according to the invention the measuring operation itself is carried out in frequency-selective manner in that the sensor electrodes are coupled via a transformer to a series resonance circuit of which the resonance frequency corresponds to the operating frequency. This enables a very low input impedance to be obtained by which the influences of the ground capacitances are suppressed. At the same time the transformer is employed to form passively the difference between the signals of the two sensor electrodes prior to the amplification so that only the differential signal of interest has to be amplified.

Advantageous further developments and embodiments of the invention are characterized in the subsidiary claims.

Figure 2:
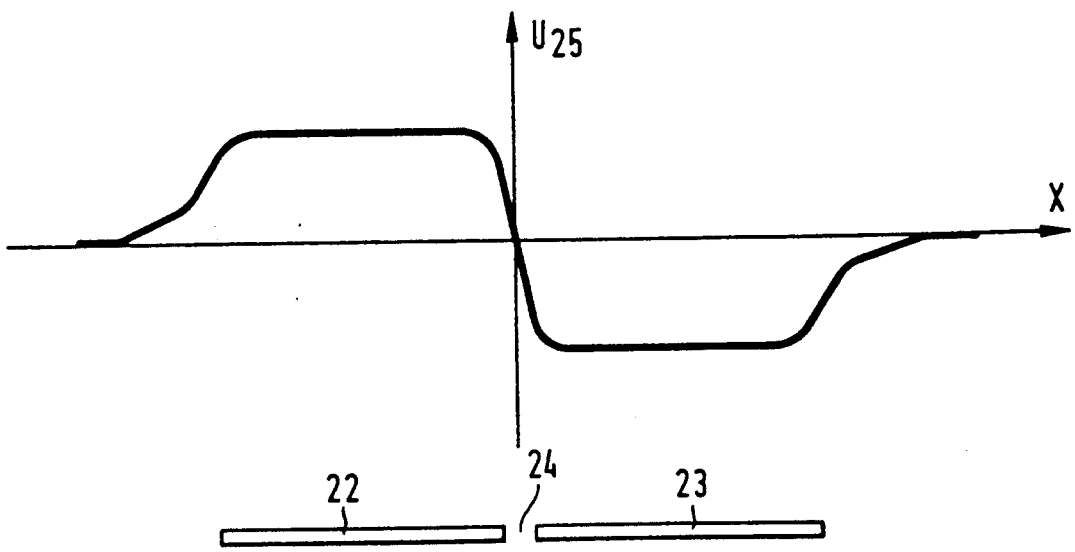
Figure 3:
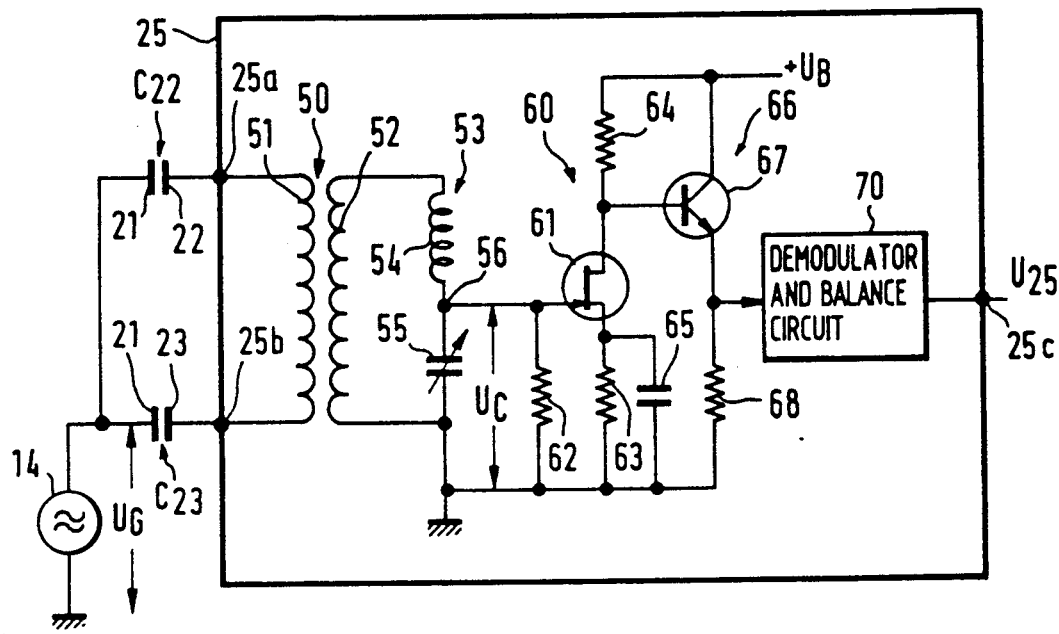
Figure 4:
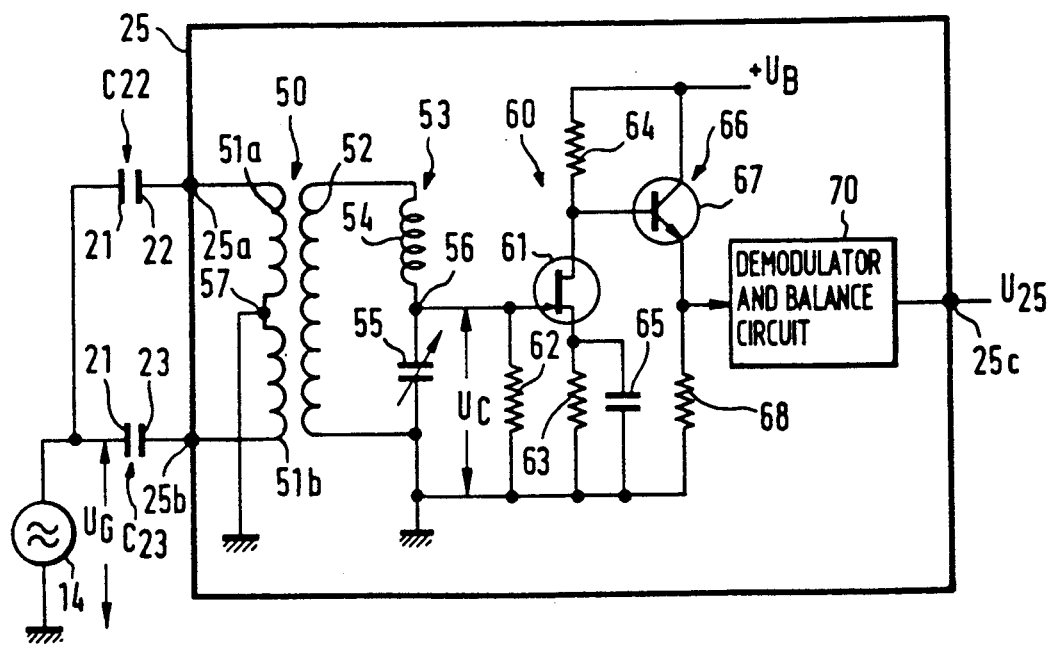

Further advantages and features of the invention will be apparent from the following description of examples of embodiment which are illustrated in the drawings, wherein:

FIG. 1 is a schematic illustration of an arrangement for correlative velocity measurement having two capacitive difference sensors as an example of use of the invention, FIG. 2 is a diagram to explain the mode of operation of one of the capacitive difference sensors of FIG. 1, FIG. 3 shows an embodiment of one of the two signal recovery circuits of the arrangement of FIG. 1 and FIG. 4 shows another embodiment of one of the two signal recovery circuits of the arrangement according to FIG. 1.

FIG. 1 shows as example for the use of capacitive difference sensors the correlative measurement of the velocity of a medium 12 transported through a pipe or tube 10. For this purpose two capacitive difference sensors 20 and 30 are arranged along the pipe 10 at a defined distance D apart. The capacitive difference sensor 20 comprises a transmitting electrode 21 and two sensor electrodes 22 and 23 which lie opposite the transmitting electrode 21 in such a manner that the medium 12 flows through the intermediate space between the transmitting electrode and each of the two sensor electrodes. The electrodes may be attached to the outside of the pipe 10 if the latter consists of a dielectric material. The two sensor electrodes 22 and 23 succeed each other in the flow direction a slight distance apart so that between them a gap 24 is formed having a width B which is small compared with the dimensions of the transmitting electrode 21 and the sensor electrodes 22, 23 measured in the flow direction. The length L of the transmitting electrode 21 measured in the flow direction is greater than the extent of the two sensor electrodes 22, 23 in this direction and is also greater than the effective distance between the transmitting electrode 21 and each sensor electrode 22 and 23.

The sensor electrode 22 forms with the transmitting electrode 21 a capacitor having the capacitance $C_{22}$ and the sensor electrode 23 forms in the same manner with the transmitting electrode 21 a capacitor having the capacitance $C_{23}$. The capacitances $C_{22}$ and $C_{23}$ depend on the electrode dimensions, the electrode spacing and the dielectric constant of the dielectric disposed between the electrodes. The dielectric is formed substantially by the medium 12 which flows through the pipe 10 and the velocity of which is to be measured.

The transmitting electrode 21 is connected to the one pole of an AC voltage source 14 of which the other pole lies at a reference potential which in the illustration of FIG. 1 is the ground potential. The AC voltage source 14 applies an AC voltage $U_G$ of frequency $f_G$ with respect to the reference potential to the transmitting electrode 21.

The sensor electrode 22 is connected to one input 25$a$ of an electronic signal recovery circuit 25 and the sensor electrode 23 is connected to the other input 25$b$ of the electronic signal recovery circuit 25. The signal recovery circuit 25 is so constructed that it responds to the displacement currents which are influenced in each sensor electrode 22 and 23 due to the AC voltage $U_G$ applied by the AC voltage source 14 to the transmitting electrode 21 and at its output 25$c$ furnishes a signal $U_{25}$ which corresponds to the difference between the displacement currents induced in the two sensor electrodes 22 and 23.

If the sensor electrodes 22 and 23 have the same dimensions and if it is first assumed that the dielectric formed by the medium 12 is homogeneous then the capacitances $C_{22}$ and $C_{23}$ are of equal magnitude and consequently the displacement currents induced due to the AC voltage $U_G$ in the sensor electrodes 22 and 23 are also of equal magnitude. The output signal $U_{25}$ of the signal recovery circuit 25 then has the value zero. In this manner the direct signal components which are contained in the signals furnished by the two sensor electrodes 22 and 23 are suppressed in the output signal $U_{25}$. In particular, all the interfering influences which act in the same manner on the signals of the two sensor electrodes 22 and 23 are suppressed in the output signal $U_{25}$.

This effect results by the way not only when the dielectric formed by the medium 12 is completely homogeneous but also with inhomogeneous dielectric provided that the inhomogeneities are distributed statistically in such a manner that the mean capacitances $C_{22}$ and $C_{23}$ of the capacitors formed by the sensor electrodes are of the same magnitude. This can for example be the case when the medium 12 contains a great number of finer uniformly distributed particles. The construction described thus gives an equalization of the mean basic capacitance, irrespective of the capacitive load.

If however a spatial inhomogeneity of the dielectric formed by the medium 12 occurs, by which the equilibrium of the mean capacitances $C_{22}$ and $C_{23}$ is disturbed, the capacitances $C_{22}$ and $C_{23}$ vary differently in dependence upon the position of the inhomogeneity along the axis of the pipe 10. The output signal $U_{25}$ of the signal recovery circuit 25 then assumes a value dependent on the difference between the capacitances $C_{22}$ and $C_{23}$.

FIG. 2 shows as example the output signal $U_{25}$ of the signal recovery circuit 25 as a function of the position of an inhomogeneity along the axis X of the pipe 10 in the region of the sensor electrodes 22 and 23. The origin of the coordinate system corresponds to the centre of the gap 24 between the two sensor electrodes 22, 23 which are shown for comparison beneath the X axis.

If the inhomogeneity is located in the direction of the axis X at a relatively large distance from the two sensor electrodes 22 and 23 the output signal $U_{25}$ has the value zero because the effects of the inhomogeneity on the two sensor electrodes are then very small and approximately equal.

As the inhomogeneity approaches the sensor electrode 22 the output signal $U_{25}$ increases in positive direction until it reaches a maximum value which it retains substantially during the entire passage of the inhomogeneity past the sensor electrode 22.

When the inhomogeneity reaches the gap 24 the output signal $U_{25}$ drops rapidly and passes through zero when the inhomogeneity is symmetrical with the centre of the gap 24. Beyond the zero passage the output signal $U_{25}$ assumes a negative maximum value with the same steepness and retains this value substantially during the entire passage of the inhomogeneity past the sensor electrode 23.

The central position of the inhomogeneity with respect to the gap 24 can be determined with great accuracy from the zero passage of the output signal $U_{25}$ taking place with steep gradient. All that is decisive therefor is the position of the inhomogeneity in the direction X, the position of the inhomogeneity relatively to the sensor electrodes transversely of the direction X not having any influence on the measurement result. The gradient in the vicinity of the zero passage is a maximum in the centre of the gap 24 at all points transversely of the direction X.

The advantages of using a capacitive difference sensor instead of a simple capacitive sensor with only one sensor electrode are due to the previously outlined properties of the suppression of direct signal components and of interfering influences acting in the same sense and of the high resolving power in the determination of the passage of inhomogeneities through a defined plane lying transversely of the measuring direction. This gives practically the effect of a local frequency filter with bandpass characteristic. This simplifies the signal processing because an electronic filtering can largely be dispensed with. The local frequency response can be influenced by the geometry of the sensor electrodes.

Since the transmitting electrode 21 is fed by an AC voltage the previously outlined effects of inhomogeneities result in an amplitude modulation of the displacement alternating currents induced by the AC voltage. Consequently, in the signal recovery circuit 25 for recovering the output signal $U_{25}$ a demodulation must take place, for example by a phase-sensitive rectification.

For correlative measurement of the velocity of the medium 12 transported through the pipe 10 two signals $S_x$ and $S_y$ are required which are tapped off at two points offset with respect to each other in the flow direction and then correlated with each other. The one signal $S_x$ may be the output signal $U_{25}$ of the signal recovery circuit 25 itself or may be derived therefrom. The other signal $S_y$ is formed in corresponding manner by the second capacitive difference sensor 30. The difference sensor 30 has exactly the same structure as the difference sensor 20 and comprises a transmitting electrode 31 connected to the voltage source 14 and two sensor electrodes 32 and 33 between which a gap 34 of width B is present and which are connected to the two inputs 35$a$ and 35$b$ respectively of an electronic signal recovery circuit 35. The signal recovery circuit 35 furnishes at its output 35$c$ an output signal U corresponds to the difference between the displacement currents induced in the two sensor electrodes 32 and 33.

The output signals $U_{25}$ and $U_{35}$ of the two signal recovery circuits 25 and 35 are supplied to the two inputs of a correlator 40 as the signals $S_x$ and $S_y$ to be correlated. If the correlator 40 is so constructed that it can process the output signals $U_{25}$, $U_{35}$ directly its outputs can be connected directly to the outputs of the signal recovery circuits 25, 35. Otherwise, as is illustrated in FIG. 1, between the output of each signal recovery circuit and the associated input of the correlator 40 a signal processing circuit 26 or 36 is inserted which brings the output signals of the signal recovery circuit into a form suitable for processing by the correlator 40.

In the manner known in correlative travel time or velocity measurement the correlator 40 forms the cross-correlation function of the two signals $S_x$ and $S_y$ by multiplying instantaneous values of the signal $S_y$ by instantaneous values of the signal $S_x$ delayed by variable displacement times and forming the mean values of the products over a predetermined observation time. For each value of the displacement time a support value of the cross-correlation function is obtained. In the use illustrated the cross-correlation function has a maximum at a defined displacement time which is equal to the travel time of the medium from the difference sensor 20 to the difference sensor 30. This is because the spatial inhomogeneities of the dielectric on passage through the gaps of the two difference sensors generate in the output signals fluctuations of the type shown in FIG. 2 which have certain similarities. Since the distance D between the gaps 24 and 34 of the two difference sensors 20 and 30 is known exactly the flow velocity of the medium 12 can easily be calculated from the travel time determined.

FIG. 3 illustrates a first example of embodiment of the signal recovery circuit 25 of FIG. 1. The two sensor capacitances $C_{22}$ and $C_{23}$ which are formed by the sensor electrodes 22 and 23 respectively with the portions of the transmitting electrode 21 lying opposite them are represented symbolically by capacitor circuit symbols. The plates of said capacitors corresponding to the transmitting electrode 21 are applied as in FIG. 1 with respect to the ground potential to the AC voltage $U_G$ with frequency $f_G$ furnished by the AC voltage source 14.

The signal recovery circuit 25 contains as input member a transformer 50 having a primary winding 51 and a secondary winding 52. The terminals of the primary winding 51 correspond to the input terminals 25a, 25b of FIG. 1. The sensor electrodes 22 and 23 are thus connected directly to the one or other terminal of the primary winding 51.

Connected to the secondary winding 52 is a series resonance circuit 53 which is formed by a coil 54 and a capacitor 55. The inductance $L_{54}$ of the coil 54 and the capacitance $C_{55}$ of the capacitor 55 are so dimensioned that the resonance frequency of the series resonance circuit 53 is equal to the frequency $f_G$ of the AC voltage $U_G$ furnished by the AC voltage source 14. The capacitor 55 is preferably adjustable for exact tuning of the series resonance circuit 53 to the resonance frequency.

The terminal of the capacitor 55 connected to the secondary winding 52 is connected to ground. The connecting point between the other terminal of the capacitor 55 and the coil 54 forms the tap 56 of the series resonance circuit. Connected to said tap 56 is an amplifier stage 60 which is formed by a field-effect transistor 61, a gate resistor 62, a source resistor 63, a drain resistor 64 and a capacitor 65 lying in parallel with the source resistor 63.

The gate electrode connected to the tap 56 and the source electrode are connected via the resistors 62 and 63 to ground whilst the drain electrode is connected via the resistor 64 to the positive supply voltage $+U_B$. Thus, the amplifier stage 60 amplifies the voltage $U_C$ present between the tap 56 and ground at the capacitor 55 of the series resonance circuit 53.

The amplifier stage 60 is followed by an impedance converter stage 66 which is formed by an NPN transistor 67 which is connected as emitter follower having an emitter resistor 68. The base of the transistor 67 is connected to the drain electrode of the field-effect transistor 61 at which the amplified voltage is available. Connected to the output of the impedance converter stage 66 formed by the connecting point between the emitter of the transistor 67 and the emitter resistor 68 is a demodulator and balancing circuit 70 which can be formed in any desired manner known per se and is therefore only symbolically represented by a circuit block. The demodulator circuit 70 demodulates the AC voltage with carrier frequency $f_G$ amplitude-modulated by the influences of the inhomogeneities, thus giving the desired differential signal which is furnished as output signal $U_{25}$. The demodulation may for example be effected by a phase-sensitive rectification for which due to the same phase position the AC voltage $U_G$ used for feeding the transmitting electrode 21 can be employed as reference signal. In the demodulator and balancing circuit 70 a zero balance can also be carried out in order to compensate any asymmetry due to different basic capacitances of the sensor electrodes or due to a capacitive coupling-in of the reference signal required for the demodulation in such a manner that the output signal in the absence of any influence of inhomogeneities does indeed have the value zero. Such steps are known to the expert and will consequently not be described in detail here.

The above description of the signal recovery circuit 25 also applies of course to the signal recovery circuit 35 which has exactly the same structure and the same mode of operation.

In FIG. 4 another embodiment of the signal recovery circuit 25 is shown which differs from that of FIG. 3 only in that the primary winding 51 has a central tap 57 which is connected to the reference potential of the AC voltage 14, i.e. in the present case to ground potential. The primary winding 51 is thereby divided into two halves 51a and 51b which with opposite directions of action are connected to the sensor electrodes 22 and 23, respectively. The two primary winding halves 51a and 51b may of course also be formed by two separate primary windings which are coiled with opposite winding sense, preferably in bifilar manner, onto the coil core of the transformer 50.

All the remaining components of the embodiment of FIG. 4 are identical to those of the embodiment of FIG. 3 and are therefore provided with the same references as therein.

In the embodiment of the signal recovery circuit shown in FIG. 3 the forming of the difference between the output signals of the two capacitive sensor electrodes 22 and 23 results from the opposite galvanic coupling via the common primary winding 51 of the transformer 50. In the embodiment of FIG. 4 the forming of the difference results from the inductive coupling via the two oppositely acting primary winding halves 51a, 51b.

In both cases the differential signal is amplified in frequency-selective manner with small bandwidth by the resonance operation of the series resonance circuit coupled on the secondary side and as a result in particular low-frequency signal components as are caused by statically charged particles are suppressed. In addition, the difference circuit has a very low input impedance because the secondary-side impedance, consisting in the resonance state only of the ohmic component of the resonance circuit parts, is transformed by the transformer with the square of the turns ratio on the primary side. The low input impedance suppresses in particular the influence of the ground capacitances.

Instead of the voltage at the capacitor the voltage could equally well be tapped from the coil of the series resonance circuit. In the examples of embodiment of FIGS. 3 and 4 the positions of the capacitor and coil would then preferably be interchanged so that the voltage to be amplified is again tapped off between the tap of the series resonance circuit and ground.

The signal recovery circuit described is not restricted to the use in the capacitive sensors having two integral sensor electrodes illustrated as example. It can be used equally well in difference sensors of which the sensor electrodes, as likewise known from U.S. Pat. No. 4,752,727, mentioned at the beginning, each consist of a plurality of subelectrodes which can also be nested in each other.

We claim:

1. Circuit arrangement for signal recovery in a capacitive difference sensor comprising two sensor electrodes, each of which lies opposite a transmitting electrode fed by an electrical AC voltage source, the circuit arrangement being so constructed that it generates a differential signal which corresponds to the difference of the displacement currents induced in the two sensor electrodes, wherein the two sensor electrodes are coupled via a transformer in opposite senses to a series resonance circuit of which the resonance frequency corresponds to the frequency of the AC voltage source, the differential signal being taken off at the tap of the series resonance circuit.

2. Circuit arrangement according to claim 1, wherein the transformer has a primary winding and a secondary winding, the two sensor electrodes being connected to the one and the other terminal of the primary winding, respectively, and the series resonance circuit being connected to the two terminals of the secondary winding.

3. Circuit arrangement according to claim 2, wherein the primary winding is divided by a centre tap into two winding halves and the centre tap is connected to the difference potential of the AC voltage source.

4. Circuit arrangement according to claim 3, wherein the two halves of the primary winding are formed by two oppositely wound separate primary windings.

5. Circuit arrangement according to claim 4, wherein the two primary windings are wound in bifilar manner.

6. Circuit arrangement according to claim 1, wherein to the tap of the series resonance circuit an amplifier is connected for amplifying the tapped voltage.

7. Circuit arrangement according to claim 6, wherein the amplifier is followed by a demodulator.

* * * * *